J. CROOKES.
HARDENING PAN FOR CIRCULAR SAWS.
No. 66,305. Patented July 2, 1867.
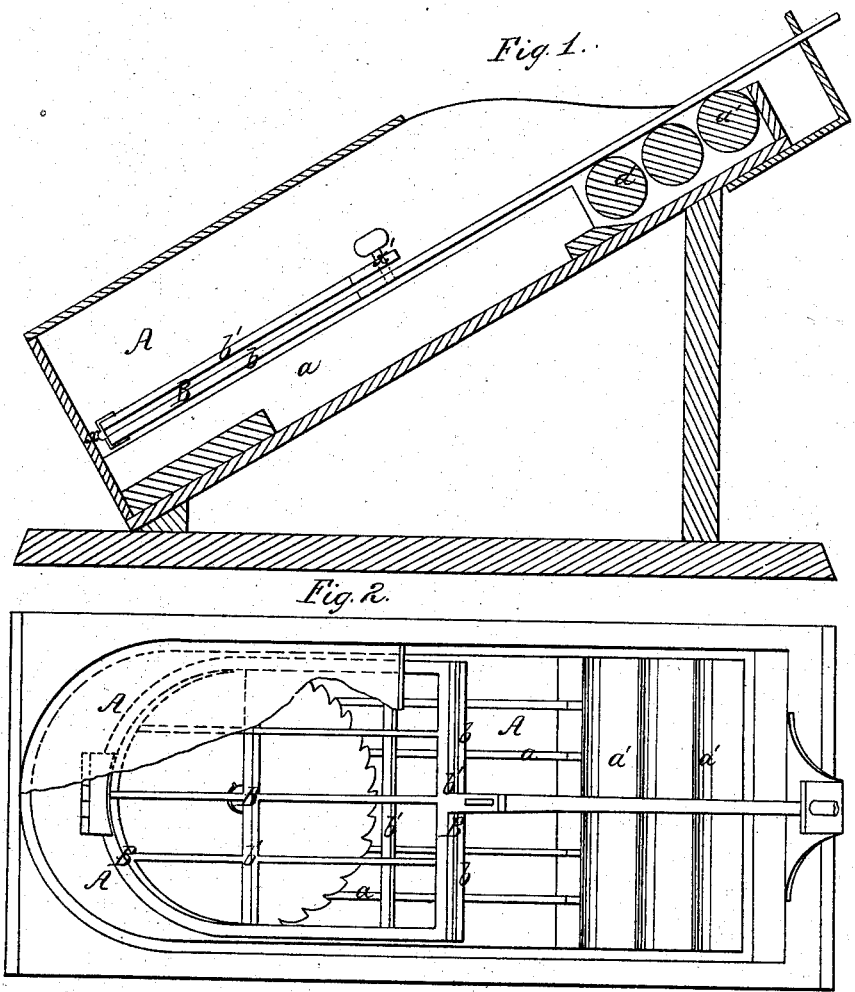

United States Patent Office.

JOSEPH CROOKES, OF ST. LOUIS, MISSOURI, ASSIGNOR TO HIMSELF AND JOSEPH W. BRANCH, OF SAME PLACE.

Letters Patent No. 66,305, dated July 2, 1867.

IMPROVED HARDENING-PAN FOR CIRCULAR SAWS, &c.

*The Schedule referred to in these Letters Patent and making part of the same.*

TO ALL WHOM IT MAY CONCERN:

Be it known that I, JOSEPH CROOKES, of the city and county of St. Louis, and State of Missouri, have invented a new and useful improvement in Hardening-Pans for Circular Saws, &c.; and I do hereby declare that the following is a full and clear description thereof, reference being had to the accompanying drawings and to the letters of reference marked thereon.

This invention relates to a hardening-pan for containing the oil or other fluid into which saw-plates or other similar articles are plunged for the purpose of hardening, the said pan being wholly enclosed on all sides save one, and set at an angle of about thirty degrees (more or less) with the horizon, and having its bottom provided with ways for the double purpose of guiding the clamped saw into and out of the bath, and for the purpose of raising the plate during its immersion in the bath up into the central part of the surrounding fluid, so as to harden both top and bottom of the saw or other plate evenly. There is also, in connection with the hardening-pan, a clamp for retaining the saw in position.

To enable those skilled in the art to make and use my improved hardening-pan, I will proceed to describe its construction and operation.

Figure 1 of the drawings is a longitudinal sectional elevation of the improved hardening-pan and its plate clamp.

Figure 2 is a plan of the same, a portion of the top of the pan being broken out in this view to disclose the parts within.

A is the hardening-pan, usually formed of sheet metal, and constructed water-tight for the purpose of retaining the oil or other tempering fluid. This pan is somewhat longer than the plate clamp B, and is open only at the top end for the admission of the plates to be hardened. The position of the pan is at an angle of about thirty degrees (more or less) with the horizon, as is shown in fig. 1, the object being to retain sufficient fluid in the lower end of the pan to wholly submerge the plate to be hardened, and at the same time to present the inclined top edges of the ways a in such a position as to allow the clamp to slide down easily thereon into the bath. The ways a may be formed of thin metal plates placed edgewise on top of the bottom of the pan, and secured in such positions that their top edges will all be true and out of wind, in case it is desired to slide the saw or other plates down into the bath on them without the use of the clamp B. The ways a may extend entirely to the top end of the pan, or they may be so shortened as to leave room for the introduction of the rollers a' above their upper ends. These rollers may be used for the purpose of facilitating the rapid immersion of the hot plates into the bath, or the withdrawal of them therefrom. The clamp B is formed of a lower part, b, and an upper part, b', the two parts being hinged together at x, and secured together at x' by means of a screw or hook. Both the upper and lower parts of this clamp are formed of metallic bars arranged in the form of lattice work, the said bars arranged in different positions in the two parts, and their adjacent edges faced off truly so as to hold the plate C in a true position while being hardened in the bath. The clamp B may be constructed in the form of a carriage resting on wheels or sheaves, either fitted to run on the bottom of the pan or on the ways a.

Having described my invention, what I claim, is—

1. The pan A, when provided with the inclined ways a, either with or without the rollers a', substantially as and for the purpose set forth.

2. I claim the clamp B for the purpose of confining the plates C in a true position while immersed in the bath in the pan A, as described and shown.

JOSEPH CROOKES.

Witnesses:
M. RANDOLPH,
GEO. P. HERTHEL, Jr.